(12) United States Patent
Zhuang et al.

(10) Patent No.: US 10,901,239 B2
(45) Date of Patent: Jan. 26, 2021

(54) LENSES AND EYEGLASSES FOR CORRECTION OF COLOR BLINDNESS

(71) Applicant: PILESTONE, INC., Philadelphia, PA (US)

(72) Inventors: Tiangang Zhuang, Philadelphia, PA (US); Shangzi Zou, Philadelphia, PA (US); Ximin Yin, Jurong (CN)

(73) Assignee: PILESTONE, INC., Philadelphia, PA (US)

(*) Notice: Subject to any disclaimer, the term of this patent is extended or adjusted under 35 U.S.C. 154(b) by 0 days.

(21) Appl. No.: 15/920,414

(22) Filed: Mar. 13, 2018

(65) Prior Publication Data
US 2020/0201080 A1    Jun. 25, 2020

(51) Int. Cl.
*G02C 7/10* (2006.01)
*C09D 7/61* (2018.01)
*C09D 7/41* (2018.01)

(52) U.S. Cl.
CPC .............. *G02C 7/108* (2013.01); *C09D 7/41* (2018.01); *C09D 7/61* (2018.01); *G02C 2202/10* (2013.01)

(58) Field of Classification Search
CPC ...... G02C 7/108; G02C 2202/10; C09D 7/61; C09D 7/41
USPC ...................... 351/41, 159.01, 159.6, 159.65
See application file for complete search history.

(56) References Cited

U.S. PATENT DOCUMENTS

| | | | |
|---|---|---|---|
| 5,989,462 A * | 11/1999 | Buazza | B29D 11/00442 264/1.36 |
| 8,845,095 B2 | 9/2014 | Harding et al. | |
| 9,028,064 B2 | 5/2015 | Harris | |
| 2011/0200810 A1 * | 8/2011 | Kubota | C09D 5/006 428/220 |

FOREIGN PATENT DOCUMENTS

| WO | 2005/003841 A1 | 1/2005 |
|---|---|---|
| WO | 2016/016249 A1 | 2/2016 |

* cited by examiner

*Primary Examiner* — Tuyen Tra
(74) *Attorney, Agent, or Firm* — DT Ward, PC; Donna T. Ward; Lingyun Jia

(57) ABSTRACT

The present invention relates to optical devices for use by color blindness viewers and more particularly, to eyeglasses which improve the ability of a color blindness viewer to discriminate between different colored objects.

18 Claims, 3 Drawing Sheets

LENSES AND EYEGLASSES FOR CORRECTION OF COLOR BLINDNESS

FIELD OF THE INVENTION

The present invention relates to lenses and eyeglasses for color blindness and vision deficiency. Also provided in the present invention are methods for coating the lenses and eyeglasses for color blindness.

BACKGROUND OF THE INVENTION

Color blindness, also known as color vision deficiency is a type of vision deficiency in the way a person sees colors. A patient with this vision problem, has difficulty in distinguishing certain colors, such as blue and yellow, or red and green. Most people who has certain color blindness, can see colors but with certain colors washed off and being confused with other colors, dependent on the type of color vision of color vision deficiency they have. Color blindness is an inherited condition that affects males more frequently than females. According to the Prevent Blindness America, an estimated 8 percent of males and less than 1 percent of females have color vision problems. Red-green color deficiency is the most common form of color vision deficiency that is caused by the loss or limited function of red cone or green cone photopigments. Others forms of color blindness include blue-yellow color blindness and complete color blindness.

Color blindness can cause some degrees or severe discomfort to a patient's life making it difficult to read color-coded information such as bar graphs and pie charts. For example, color blindness may limit a patient to take some professions such as graphic design and occupations that require handling various colors of electrical wiring, depend on accurate color perception.

There is no cure for color blindness. But some coping strategies can help the patient function better in a color-oriented world. The most common are special lenses for color blindness. For example, Patient can wear special lenses to enhance color perception. People with red-green color blindness may be able to use a special set of lenses to help them perceive colors more accurately. The present invention provides new types of lenses and eyeglasses for correction of color blindness.

SUMMARY OF THE INVENTION

Figure 1:
FIG. 1 is a representative image of a pair of eyeglass for correction of color blindness.

In one aspect of the present invention, lenses and eyeglasses comprising three layers colored materials are provided. The lenses and eyeglasses may be used for correction of color blindness in a person with color blindness such as red-green color deficiency.

In one preferred embodiment, the lens and/or eyeglass is a titanium oxide coated brown lens or glasses. Said lens or glass may comprise three layers of colored materials including i) a layer of a mixture of red color pigments, including dimethyl-anthracene, 2-isoquinoline, tetraone, 3-ethyl-5-methylphenol, 3,4,9,10-perylenetetracarboxylic diimide; ii) a layer of yellow color pigments including a mixture of lead chromate, lead sulfate and lead oxide; and iii) a layer of blue pigments including ferrous/potassium ferricyanide double salt.

In some embodiments, the lens for correction of color blindness can block UV lights. The outer surface of the lens is further coated with a film of UV lights blocking compounds comprising silica, titanium pentoxide and fluoride. The film may be water resistant.

In another aspect of the present invention, a method for coating a lens for correcting color blindness is provide; the method comprising the steps of (a) preparing a solution of red color pigments, a solution of yellow color pigments and a solution of blue color pigments, respectively; (b) contacting a lens with the solution of red color pigments in step (a) for about 10 minutes; (c) contacting the same lens with the solution of blue color pigments in step (a) for about 5 minutes; and (d) contacting the same lens with the solution of yellow color pigments in step (a) for about 10 minutes.

The method may further comprise a step for coating the colored lens with a UV lights blocking film, such as a titanium pentoxide film, including silica, titanium pentoxide and fluoride. The outer surface of the lens is coated with said titanium pentoxide film. The UV blocking film may be water resistant.

DETAILED DESCRIPTION OF THE INVENTION

The details of one or more embodiments of the invention are set forth in the accompanying description below. Although any materials and methods similar or equivalent to those described herein can be used in the practice or testing of the present invention, the preferred materials and methods are now described. Other features, objects and advantages of the invention will be apparent from the description. In the description, the singular forms also include the plural unless the context clearly dictates otherwise. Unless defined otherwise, all technical and scientific terms used herein have the same meaning as commonly understood by one of ordinary skill in the art to which this invention belongs. In the case of conflict, the present description will control.

Unless otherwise defined, all technical and scientific terms used herein have the same meaning as commonly understood by one of ordinary skill in the art to which this invention belongs. Although methods and materials similar or equivalent to those described herein can be used in the practice or testing of methods featured in the invention, suitable methods and materials are described below in the detailed description, examples and claims.

In the claims, articles such as "a," "an," and "the" may mean one or more than one unless indicated to the contrary or otherwise evident from the context. Claims or descriptions that include "or" between one or more members of a group are considered satisfied if one, more than one, or all the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or the entire group members are present in, employed in, or otherwise relevant to a given product or process.

It is also noted that the term "comprising" is intended to be open and permits but does not require the inclusion of additional elements or steps. When the term "comprising" is used herein, the term "consisting of" is thus also encompassed and disclosed.

Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise.

In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein. Any particular embodiment of the compositions of the invention (e.g., any antibiotic, therapeutic or active ingredient; any method of production; any method of use; etc.) can be excluded from any one or more claims, for any reason, whether or not related to the existence of prior art.

It is to be understood that the words which have been used are words of description rather than limitation, and that changes may be made within the purview of the appended claims without departing from the true scope and spirit of the invention in its broader aspects.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

The present invention is drawn to lenses and eyeglasses for correction of color blindness, for example, red-green color blindness. The lenses and eyeglasses can also block UV lights. In accordance, the lenses and eyeglasses of the present invention may improve the color discrimination of a color-blind person when applying the lenses or eyeglasses to the eyes. The lens may be a contact lens or an eyeglass lens.

In one preferred embodiment, the lens is an eyeglass lens and the eyeglasses are regular eyeglasses. Generally, the present invention may include any one of a variety of conventional eyeglass configurations. As a non-limiting example, the eyeglass structure may include any eyeglass frame having two spaced apart frame portions coupled by an intermediate member and an arm coupled to and extending from an outside edge of each frame portion.

In some embodiments, the lens maybe a contact lens. A contact lens made in accordance with this invention typically has a lens thickness in the order of 0.15 mm. The size of the lens depends somewhat on the size of the eye to be fitted and is in the range of about 11 mm to about 15 mm.

In some embodiments, the lens contains a pluritary of thin layers of coloration, for example, 2, 3, 4, 5, 6, 7, 8, 9, or 10 layers of coloration. In one example, the lens contains three layers of coloration, comprising a layer of red coloration, a layer of blue coloration and a layer of yellow coloration.

The lens may be first coated with a layer of red coloration. The red coloration may comprise a mixture of red color pigments including dimethyl-anthracene, 2-isoquinoline, tetraone, 3-ethyl-5-methylphenol, 3,4,9,10-perylenetetracarboxylic diimide. The lens may then be coated with a layer of yellow coloration. The yellow coloration may comprise a mixture of yellow color pigments including lead chromate, lead sulfate, lead oxide mixture. The lens may also be coated with another layer of blue coloration. The blue coloration may comprise a mixture of blue color pigments including ferrous/potassium ferricyanide double salt.

The red coloration layer may comprise dimethylanthracene, or a derivative thereof.

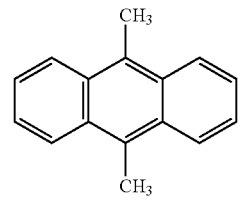

Dimethylanthracene

The red coloration layer may comprise tetraone, or a derivative thereof.

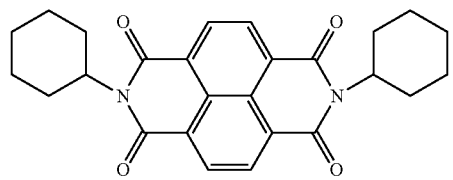

1,3,6,8(2H,7H)-Tetraone

The red coloration layer may comprise 3-ethyl-5-methylphenol having a formula of $C_9H_{12}O$, or a derivative thereof.

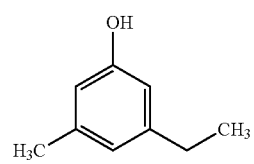

3-ethyl-5-methylphenol

The red coloration layer may comprise 3,4,9,10-perylenetetracarboxylic diimide and a derivative thereof, for example, N,N'-Di-n-octyl-3,4,9,10-perylenetetracarboxylic Diimide.

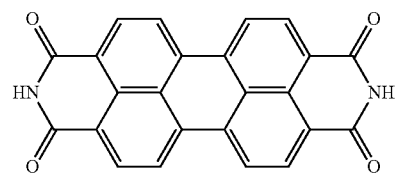

3,4,9,10-perylenetetracarboxylic diimide

-continued

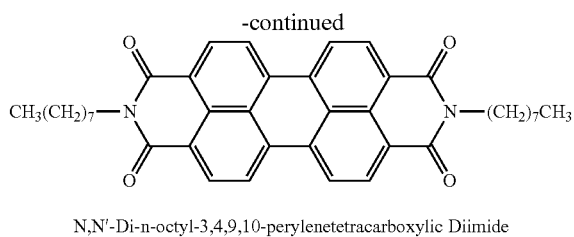

N,N'-Di-n-octyl-3,4,9,10-perylenetetracarboxylic Diimide

The yellow coloration layer may comprise lead chromate (also known as chrome yellow, chromic acid lead(II) salt, canary chrome yellow 40-2250, chrome green, chrome green UC61, chrome green UC74, chrome green UC76, chrome lemon, crocoite, dianichi chrome yellow G, lemon yellow, king's yellow, Leipzig yellow, lemon yellow, Paris yellow, pigment green 15, plumbous chromate, and pure lemon chrome L3GS) having a formula of $PbCrO_4$ or $CrO_4Pb$.

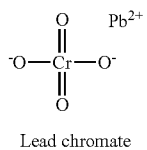

Lead chromate

The yellow coloration layer may comprise lead sulfate (also known as fast white, milk white, sulfuric acid lead salt and anglesit) having a formula of $PbSO_4$ or $O_4PbS$.

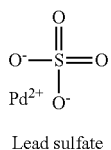

Lead sulfate

The yellow coloration layer may comprise lead oxide such as Lead (II) oxide (PbO), Lead (II, IV) oxide ($Pb_3O_4$), Lead (IV) oxide ($PbO_2$), and other derivatives thereof.

The blue coloration layer may comprise ferrous/potassium ferricyanide double salt having a formula of $K_3Fe(CN)_6$, or a derivative thereof.

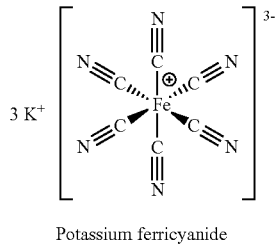

Potassium ferricyanide

In some embodiments, the outer surface of the lens is further coated with UV lights blocking film. The film may comprise titanium pentoxide. The titanium pentoxide film is composed of silica, titanium pentoxide, and fluoride. The blocking material is water resistant. The titanium pentoxide may include Titanium dioxide (titanium(IV) oxide), $TiO_2$, Titanium(II) oxide (titanium monoxide), TiO, titanium(III) oxide (dititanium trioxide), $Ti_2O_3$, $Ti_3O$, and $Ti_2O$. Other UV lights blocking compounds that can absorb sunlight's UVA and UVB radiation may also be used to coat the lens, including but not limited to, 4-aminobenzoic, avobenzone, bemotrizinol, benzophenone-9, 3-benzylidenecamphor, benzylidene camphor sulfonic acid, bisoctrizole, cinoxate, dioxybenzone, drometrizole trisiloxane, ecamsule, ensulizole(2-Phenylbenzimidazole 5-sulfonic acid), ethyl cinnamate, 2-Ethylhexyl salicylate, 2-Ethylhexyl 4-methoxycinnamate, ethylhexyl triazone, hexyl 2-[4-(diethylamino)-2-hydroxybenzoyl]benzoate, homosalate, 3-(4-Methylbenzylidene)camphor, oxybenzone, octyl methoxycinnamate, octocrylene, oxybenzone-(phenyl-$d_5$), padimate O, 2-Phenyl-5-benzimidazolesulfonic acid, 2,2'-(1,4-Phenylene)bis-1H-benzimidazole-4,6-disulfonic acid, sulisobenzone, trolamine salicylate, and zinc oxide.

In some embodiments the coloration materials for coating the lens are water insoluble.

In some embodiments, the thin layers of coloration may be only coated to the lens of the present invention on its spherical external center. The colored area may have a diameter of 5-8 mm. The colored area that is at the corneal apex is in the axis of the pupil of the eye. The application of the coloration layers is limited to the center area and the rest of the lens is left clear.

In some embodiments, the lens may be made of any materials suitable for making a lens, such as light-transmitting plastics (e.g., polycarbonate), high-index plastics, glass (e.g., borosilicate glass), and lightweight composites. In one preferred embodiment, the lens is a resin lens.

In accordance with the present invention, eyeglasses comprising a pair of the lenses for correction of color blindness as described herein are provided. The eyeglasses consist of pair of the lenses of the present invention and a frame to hold them in place. The frames may be made from metal or plastic. Metal frames, particularly expensive ones, are often made of mixtures of nickel and other metals such as silver. These frames have precisely engineered features, such as sculpted and gimbaled nose-pads, durable hinges with self-locking screws, and flexible temples.

Figure 2A:
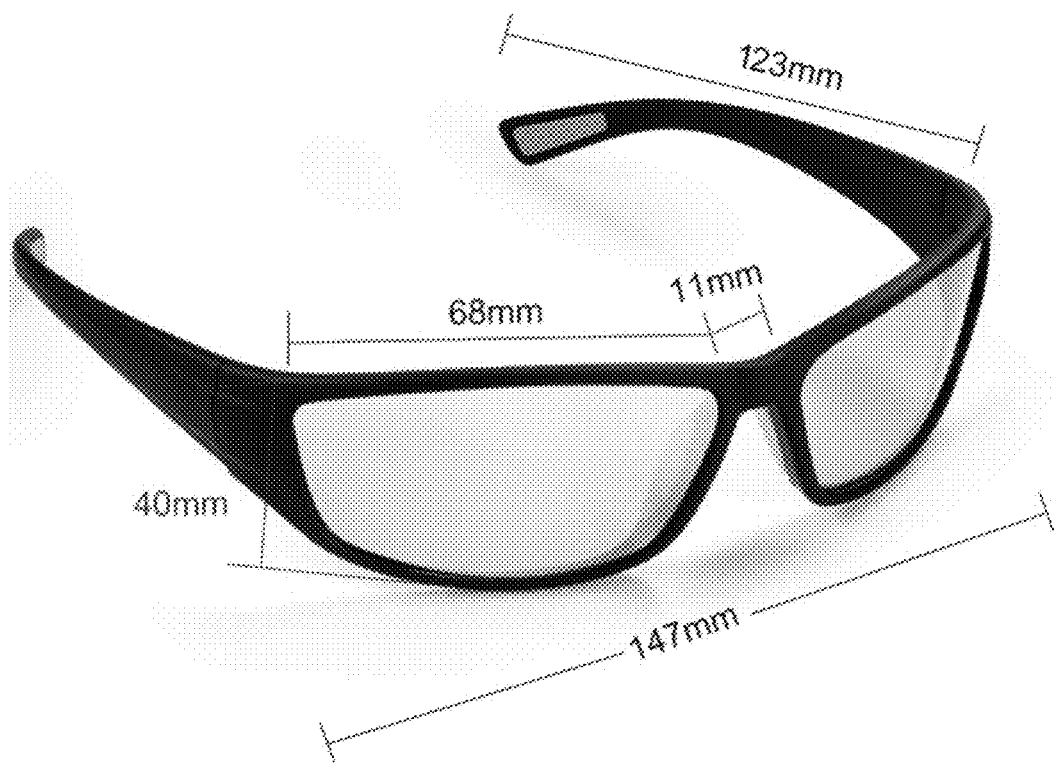
FIG. 2A and 2B are alternative eyeglasses for correction of color blindness.
Figure 2B:
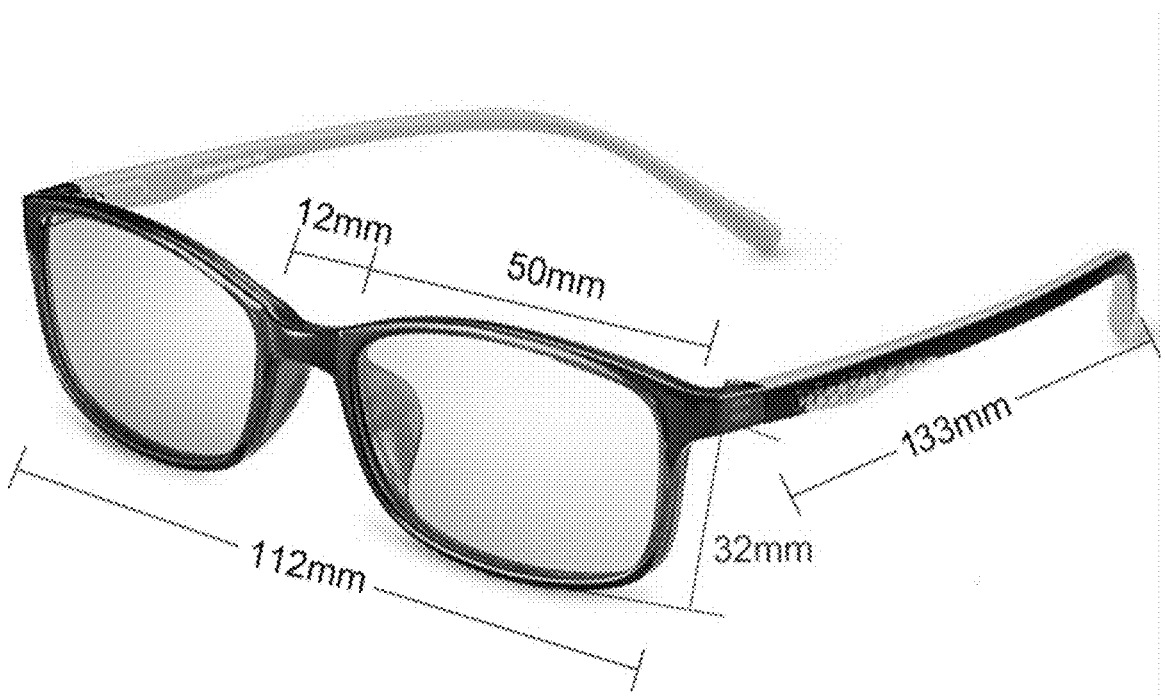

In accordance with the present invention, the eyeglass lens may be configured to produce a pair of eyeglasses suitable for a person who suffers color blindness, particularly red-green color blindness. As a non-limiting example, the eyeglasses may have a dimension as shown in FIG. 1. In alternative examples, the eyeglasses may have dimensions shown in FIGS. 2A and 2B. A person skilled in the art would understand that the size and thickness of the lens can be adjusted to fit a particular purpose.

The present invention also includes methods for preparing a lens for correcting color blindness. The method may comprise the steps of a) preparing a solution of red color pigments, a solution of yellow color pigments and a solution of blue color pigments, respectively; (b) contacting a lens with the solution of red color pigments in step (a) for about 10 minutes; (c) contacting the same lens with the solution of blue color pigments in step (a) for about 5 minutes; and (d) contacting the same lens with the solution of yellow color pigments in step (a) for about 10 minutes.

In some embodiments, the method further comprises a step for coating the colored lens with a UV lights blocking film, such as a titanium pentoxide film. The film may include silica, titanium pentoxide and fluoride. The outer surface of the lens is coated with said titanium pentoxide film. The UV blocking film may be water resistant.

Specific Examples of the Invention

Example 1

1000 ml of water was pulled into three beakers and heated to 80° C. 50 g of red pigments of dimethyl-anthracene, 2-isoquinoline, tetraone, 3-ethyl-5-methylphenol, 3,4,9,10-perylenetetracarboxylic diimide were added to one of the three beakers. 50 g of blue pigments of a mixture of lead chromate, lead sulfate and lead oxide were added to the second beaker. 50 g of yellow pigments of ferrous/potassium ferricyanide double salt were added the last beaker. The mixtures were stirred until all the compounds were dissolved and formed solutions.

A clear transparent glass lens was dipped into the beaker containing the solution of red color pigments for 10 minutes. The lens was removed from the red coloration solution and immersed into the solution of blue color pigments for 5 minutes. The lens was then immersed into the solution of yellow color pigments for 10 minutes. The coated lens has an appearance of brown color.

The color coated lens was then coated with a film of titanium pentoxide materials including silica, titanium pentoxide and fluoride.

The titanium pentoxide coating process included 1). Positioning the lens by a fixture into a vacuum coating machine for vacuum coating, 2). Subjecting the surface of the lens to ion bombardment under a vacuum value of 5.0 * 10e+5 TORR, 3). Roughening the surface by an ion gun. 4). Evaporating the mixed materials (silica, titanium pentoxide) to the lens surface with the electronic gun for 10 times. When the surface color of the treated lens is turned to silver, water resistant alkyl phosphate coated fluoride film is plated on the lens surface.

The invention claimed is:

1. A lens for correcting color blindness, wherein the lens is coated with
   (a) a layer of red coloration pigments comprising dimethyl-anthracene, 2-isoquinoline, tetraone, 3-ethyl-5-methylphenol, 3,4,9,10-perylenetetracarboxylic diimide;
   (b) a layer of blue coloration pigments comprising ferrous/potassium ferricyanide double salt; and
   (c) a layer of yellow coloration pigments comprising lead chromate, lead sulfate and lead oxide.

2. The lens of claim 1, wherein the outer surface of the lens is further coated with a film of UV lights blocking compounds comprising silica, titanium pentoxide and fluoride.

3. The lens of claim 2, wherein the film for blocking UV lights is water resistant.

4. The lens of any one of claims 1-3, wherein the lens is a contact lens or an eyeglass lens.

5. The lens of claim 4, wherein the lens is an eyeglass lens.

6. The lens of claim 5, wherein the lens is selected from the group consisting of resin lens, polycarbonate lens, high-index plastic lens, borosilicate glass lens, and lightweight composite lens.

7. The lens of claim 6, wherein the lens is a resin lens.

8. The lens of claim 7, wherein the color blindness is red-green color blindness, blue-yellow color blindness or complete color blindness.

9. A pair of eyeglasses for correcting color blindness comprising a pair of lenses configured for correction of color blindness and a frame, wherein the lens is coated with
   (a) a layer of red coloration pigments comprising dimethyl-anthracene, 2-isoquinoline, tetraone, 3-ethyl-5-methylphenol, 3,4,9,10-perylenetetracarboxylic diimide;
   (b) a layer of blue coloration pigments comprising ferrous/potassium ferricyanide double salt; and
   (c) a layer of yellow coloration pigments comprising lead chromate, lead sulfate and lead oxide.

10. The pair of eyeglasses of claim 9, wherein the outer surface of the lens is further coated with a film of UV lights blocking compounds comprising silica, titanium pentoxide and fluoride.

11. The pair of eyeglasses of claim 10, wherein the lens is a resin lens.

12. The pair of eyeglasses of claim 10, wherein color blindness is red-green color blindness.

13. A method for making a lens for correcting color blindness comprising:
   (a) preparing a solution of red color pigments, a solution of yellow color pigments and a solution of blue color pigments, respectively;
   (b) contacting said lens with the solution of red color pigments in step (a) for about 10 minutes; (c) contacting the same lens with the solution of blue color pigments in step (a) for about 5 minutes; and
   (d) contacting the same lens with the solution of yellow color pigments in step (a) for about 10 minutes.

14. The method of claim 13, wherein the method further comprises
   (e) coating the outer surface of the lens with a UV lights blocking film that include silica, titanium pentoxide and fluoride.

15. The method of claim 14, wherein the lens is an eyeglass lens.

16. The method of claim 15, wherein the UV lights blocking film is water resistant.

17. A kit for making a lens for correcting color blindness comprising:
   (a) a solution of red coloration pigments comprising dimethyl-anthracene, 2-isoquinoline, tetraone, 3-ethyl-5-methylphenol, 3,4,9,10-perylenetetracarboxylic diimide;
   (b) a solution of blue coloration pigments comprising ferrous/potassium ferricyanide double salt; and
   (c) a solution of yellow coloration pigments comprising lead chromate, lead sulfate and lead oxide.

18. The kit of claim 17 further comprising
   (d) a mixture of UV lights blocking compounds comprising silica, titanium pentoxide and fluoride.

* * * * *